US010341164B2

(12) United States Patent
Bonanni et al.

(10) Patent No.: US 10,341,164 B2
(45) Date of Patent: Jul. 2, 2019

(54) MODIFYING COMPUTER CONFIGURATION TO IMPROVE PERFORMANCE

(71) Applicant: International Business Machines Corporation, Armonk, NY (US)

(72) Inventors: Cristina Bonanni, Rome (IT); Nicola Milanese, Rome (IT); Stefano Sidoti, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 15/590,365

(22) Filed: May 9, 2017

(65) Prior Publication Data
US 2018/0331882 A1 Nov. 15, 2018

(51) Int. Cl.
G06F 15/16 (2006.01)
H04L 29/08 (2006.01)
(52) U.S. Cl.
CPC .... H04L 29/08297 (2013.01); H04L 29/0827 (2013.01); H04L 29/08189 (2013.01); H04L 29/08459 (2013.01); H04L 29/08945 (2013.01); H04L 29/08144 (2013.01)
(58) Field of Classification Search
CPC .............. H04L 29/08297; H04L 29/0894
See application file for complete search history.

(56) References Cited

U.S. PATENT DOCUMENTS

| | | | |
|---|---|---|---|
| 6,125,372 A | 9/2000 | White | |
| 6,782,421 B1 | 8/2004 | Soles et al. | |
| 6,813,248 B1 | 11/2004 | Boss et al. | |
| 6,973,647 B2 | 12/2005 | Crudele et al. | |
| 6,983,449 B2 | 1/2006 | Newman | |
| 6,990,660 B2 | 1/2006 | Moshir et al. | |
| 7,197,559 B2 | 3/2007 | Goldstein et al. | |
| 7,991,876 B2 | 8/2011 | Yoda et al. | |
| 8,069,231 B2 | 11/2011 | Schran et al. | |
| 8,225,144 B2 | 7/2012 | Kato | |
| 8,903,993 B2 | 12/2014 | LeGendre et al. | |
| 2003/0225876 A1 | 12/2003 | Oliver et al. | |

(Continued)

OTHER PUBLICATIONS

Sun et al., "Identifying Performance Bottlenecks in CDNs through TCP-Level Monitoring," Dept. of Computer Science, Princeton University, Aug. 19, 2011, http://minlanyu-seas.harvard.edu/writeup/wmust11.pdf, 6 pgs.

(Continued)

Primary Examiner — Hua Fan
(74) Attorney, Agent, or Firm — James L. Olsen

(57) ABSTRACT

Embodiments of the present disclosure relate to improving computer performance. An action may be issued to a first client and a second client. A first optimization factor list (OFL) may be generated for the first client and a second OFL may be generated for the second client. After each OFL is generated, the first OFL may be compared to the second OFL. A correlation factor (CF) may be generated between the first client and the second client based on the OFL comparison, wherein the CF indicates a level of similarity between the first client and the second client. A bottleneck causing performance issues in the first client may be determined and computer configuration of the first client may be adjusted based on the bottleneck.

16 Claims, 7 Drawing Sheets

(56) References Cited

U.S. PATENT DOCUMENTS

| | | |
|---|---|---|
| 2004/0153831 A1 | 8/2004 | Kuth |
| 2004/0204983 A1 | 10/2004 | Shen et al. |
| 2005/0066019 A1 | 3/2005 | Egan et al. |
| 2005/0076014 A1 | 4/2005 | Agarwal et al. |
| 2007/0300215 A1 | 12/2007 | Bardsley |
| 2011/0066708 A1 | 3/2011 | Schran et al. |
| 2013/0326051 A1* | 12/2013 | LeGendre ........... H04L 43/0817 709/224 |
| 2016/0226731 A1 | 8/2016 | Maroulis |
| 2016/0254963 A1* | 9/2016 | Vibhor .................... H04W 4/50 709/222 |

OTHER PUBLICATIONS

Accelerated Examination Support Document, U.S. Appl. No. 15/893,228, dated Feb. 6, 2018, 26 pgs.

Bonanni et al., "Modifying Computer Configuration to Improve Performance," U.S. Appl. No. 15/893,228, filed Feb. 9, 2018.

List of IBM Patents or Patent Applications Treated as Related, Feb. 6, 2018, 2 pgs.

* cited by examiner

Optimization Factor Lists for Four Respective Clients

| OFL | Client A | Client B | Client C | Client D |
|---|---|---|---|---|
| CPU | 3.2GHz | 3.2GHz | 1.6GHz | 6.4GHz |
| Memory | 8GB | 6GB | 4GB | 32GB |
| Registry Key XXX | 300 | 200 | 350 | 600 |
| Registry Key YYY | 127 | 166 | 99 | 230 |
| Size of File ZZZ | 50MB | 67MB | 36MB | 123MB |
| OS | Win | Win | Lin | Win |
| Checksum | 1324 | 1227 | 8435 | 1865 |

FIG. 5A

Correlation Factor (CF) Determination for Clients A and B

| OFL | Client A | Client B | Similarity | Partial CF |
|---|---|---|---|---|
| CPU | 3.2GHz | 3.2GHz | 1.00 | 0.20 |
| Memory | 8GB | 6GB | 0.75 | 0.15 |
| Registry Key XXX | 300 | 200 | 0.67 | 0.13 |
| Registry Key YYY | 127 | 166 | 0.77 | 0.15 |
| Size of File ZZZ | 50MB | 67MB | 0.75 | 0.15 |
| | | | CF | 0.79 |

FIG. 5B

Correlation Factor (CF) Determination for Clients B and D

| OFL | Client B | Client D | Similarity | Partial CF |
|---|---|---|---|---|
| CPU | 3.2GHz | 6.4GHz | 0.50 | 0.10 |
| Memory | 6GB | 32GB | 0.19 | 0.04 |
| Registry Key XXX | 200 | 600 | 0.33 | 0.07 |
| Registry Key YYY | 166 | 230 | 0.72 | 0.14 |
| Size of File ZZZ | 67MB | 123MB | 0.54 | 0.11 |
| | | | CF | 0.46 |

FIG. 5C

MODIFYING COMPUTER CONFIGURATION TO IMPROVE PERFORMANCE

BACKGROUND

The present disclosure relates generally to the field of computer systems, and more particularly to improving computer performance by adjusting the computer configuration.

A variety of factors may affect computer performance, including the type of processor, memory, applications (e.g., running and installed), network considerations (e.g., network adapter/topology) and the like associated with a computer system. Further, computer performance may depend on a task the computer is performing (e.g., processing data packets over a network, rendering graphics, processing simultaneous calculations).

SUMMARY

Embodiments of the present disclosure include a method, computer program product, and system for improving computer performance. The method may include issuing an action to a first client and a second client. Further, the method may include generating a first optimization factor list (OFL) for the first client and a second OFL for the second client. After each OFL is generated, the method may further include comparing the first OFL to the second OFL. A correlation factor (CF) may be generated between the first client and the second client based on the OFL comparison, wherein the CF indicates a level of similarity between the first client and the second client. The method may further include determining whether there is a bottleneck causing performance issues in the first client and adjusting, in response to a determining that there is a bottleneck causing performance issues in the first client, the computer configuration of the first client based on the bottleneck.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 5A illustrates an example table of four Optimization Factor Lists (OFL's) generated for four respective clients, in accordance with embodiments of the present disclosure.

FIG. 5B illustrates an example correlation factor (CF) determination between Client A and Client B, in accordance with embodiments of the present disclosure.

FIG. 5C illustrates an example CF determination between Client B and Client D, in accordance with embodiments of the present disclosure.

Figure 1:
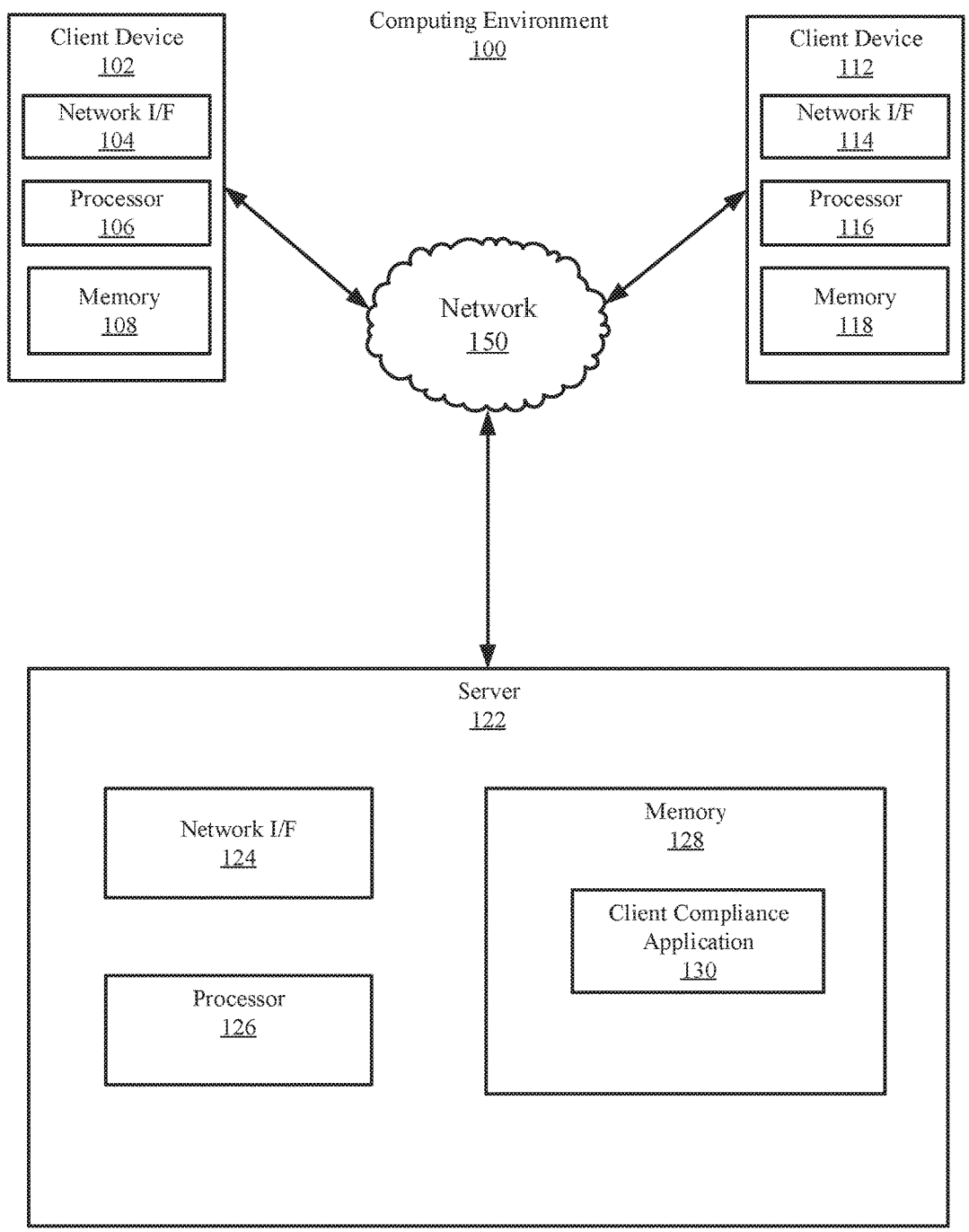
FIG. 1 depicts a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer systems, and in particular to computer performance. While the present disclosure is not necessarily limited to such applications, various aspects of the disclosure may be appreciated through a discussion of various examples using this context.

In a client-server environment, a server may include one or more applications to monitor/manage clients within the environment. The application(s) may enable the server to control the compliance of all clients within the client-server system. In order to do so, the server may install patches, software, or change configurations to execute actions on all client computers. In some instances, the operations issued by the server need to be completed within a specific time frame. When a server issues an action on a set of clients, a portion of the clients may successfully perform the action (e.g., complete the action within the specified time frame). However, other clients may not adequately perform the action (e.g., be unable to complete the action within the specified time frame).

Embodiments of the present disclosure relate to a server running an application to improve client performance within a client server environment. The server may issue an action to all clients within the system. Based on the action performance (e.g., how much of the action was completed within a given time frame, or how fast the action was completed), the application may classify clients into performance efficiency classifications. Information about each of the clients, including hardware (e.g., CPU, RAM, Disk I/O, network card, etc.), software (e.g., configurations, installed, running), and/or information specific to the action taken (e.g., configurations or network topologies) may be retrieved by the server. The information may be compiled into an optimization factor list (OFL) for each client. Each OFL may be used to compare clients within the client server environment. In some embodiments, an OFL may only contain factors relevant to the action issued by the server. In other embodiments, the OFL may contain one or more factors that are unlikely to impact the client's ability to perform the action.

In some embodiments, a correlation factor (CF) between clients may be determined. The CF may indicate a level of similarity between the clients. The CF may be used to determine whether a comparison (e.g., a comparison identifying performance issues) between two clients should be completed. For example, if two clients' OFL's differ significantly (e.g., such as different processors or operating systems), the server may be configured to not complete a comparison between the clients. However, if clients are very similar (e.g., same hardware and operating systems, however different applications running), the server may be configured to make a comparison between clients (e.g., including identifying bottlenecks and implementing changes to client computer configuration). Factors within each OFL may be weighted differently when determining the CF, as they may have different impacts on performance (e.g., a processor associated with a client may be weighted higher than a particular application running on the client).

In some embodiments, two similarly correlated machines may belong to different performance efficiency classifications. In these embodiments, the application may be configured to determine bottlenecks (e.g., issues causing slower performance) between similar machines (as indicated by the CF value) in different classes. For example, two computers may have identical hardware and substantially similar software. Accordingly, the CF value may indicate that the machines are similar (e.g., exceeds a threshold). However, the first machine may have completed the action (e.g., run a bit of code or send a particular message) within a predetermined amount of time, and the second machine may not have completed the action within the predetermined amount of time, indicating that there is a bottleneck condition affecting the second machine.

After bottlenecks are identified, the server may be configured to identify and implement a solution. In some embodiments, the server may be configured to automatically (e.g., without user input) make adjustments to the client computer configuration in an attempt to correct the performance issues. In some embodiments, the application may send an indication to the user regarding the suggested computer configuration adjustment (e.g., upgrade CPU).

After a change is implemented to the client computer configuration, the server may be configured to analyze the client computer performance to determine whether or not the change was effective. In some embodiments, after a change is implemented to a client computer configuration, the server may issue the command previously issued to test the client performance at that action. In these embodiments, the client may be reevaluated to determine whether there is a shift in the performance efficiency classification. In some embodiments, the server generates a relevance factor (RF) which may be used to indicate how effective the change was. In other words, the server may generate a score for the effectiveness of the change. For example, if a client computer system shifts from a lower performance efficiency class to a higher performance efficiency class, the application may generate a high RF to indicate that the change was effective.

Further, the server may use the RF value to alter factors present on each OFL. For example, if an implemented change had no effect on client performance, the server may be configured to remove the factor (e.g., related to the change) from the OFL. Likewise, the server may use the RF value to alter weightings associated with factors present on OFL's when correlating two clients. For example, if an adjustment had a high impact on client performance, the weight of the changed factor may be increased when making future CF determinations relevant to the same or similar server action.

Turning now to the figures, FIG. 1 depicts a block diagram of an example computing environment 100 in which illustrative embodiments of the present disclosure may be implemented. In some embodiments, the computing environment 100 may include two client devices 102 and 112 and a server 122.

Consistent with various embodiments, the server 122 and the client devices 102 and 112 may be computer systems. The client devices 102 and 112 and the server 122 may include one or more processors 106, 116, and 126 and one or more memories 108, 118, and 128, respectively. The client devices 102 and 112 and the server 122 may be configured to communicate with each other through an internal or external network interface 104, 114, and 124. The network interfaces 104, 114, and 124 may be, in some embodiments, modems or network interface cards. The client devices 102 and 112 and/or the server 122 may be equipped with a display or monitor. Additionally, the client devices 102 and 112 and/or the server 122 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the client devices 102 and 112 and/or the server 122 may be servers, desktops, laptops, or hand-held devices.

The client devices 102 and 112 and the server 122 may be distant from each other and communicate over a network 150. In some embodiments, the server 122 may be a central hub from which client devices 102 and 112 can establish a communication connection, such as in a client-server networking model. Alternatively, the server 112 and client devices 102 and 112 may be configured in any other suitable networking relationship (e.g., in a peer-to-peer (P2P) configuration or using any other network topology).

In some embodiments, the network 150 can be implemented using any number of any suitable communications media. For example, the network 150 may be a wide area network (WAN), a local area network (LAN), an internet, or an intranet. In certain embodiments, the client devices 102 and 112 and the server 122 may be local to each other, and communicate via any appropriate local communication medium. For example, the client devices 102 and 112 and the server 122 may communicate using a local area network (LAN), one or more hardwire connections, a wireless link or router, or an intranet. In some embodiments, the client devices 102 and 112 and the server 122 may be communicatively coupled using a combination of one or more networks and/or one or more local connections. For example, the first client device 102 may be hardwired to the server 122 (e.g., connected with an Ethernet cable) while the second client device 112 may communicate with the server using the network 150 (e.g., over the Internet).

In some embodiments, the network 150 may be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

The server 122 may be configured to monitor the performance of client devices 102 and 112. For example, the server 122 may include a client compliance application 130, which may be configured to improve the performance of client devices 102 and 112. The client compliance application 130 may include computer instructions to monitor/manage the client devices 102 and 112 within the computing environment 100. The client compliance application 130 may further include computer instructions to control the compliance of client devices 102 and 112 by, for example, issuing software installations (e.g., patches) on the client devices 102 and 112.

While FIG. 1 illustrates a computing environment 100 with a single server 122 and two client devices 102 and 112, suitable computing environments for implementing embodiments of this disclosure may include any number of client devices and servers. The various models, modules, systems, and components illustrated in FIG. 1 may exist, if at all, across a plurality of servers and client devices. For example, some embodiments may include two servers. The two servers may be communicatively coupled using any suitable communications connection (e.g., using a WAN, a LAN, a wired connection, an intranet, or the Internet).

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
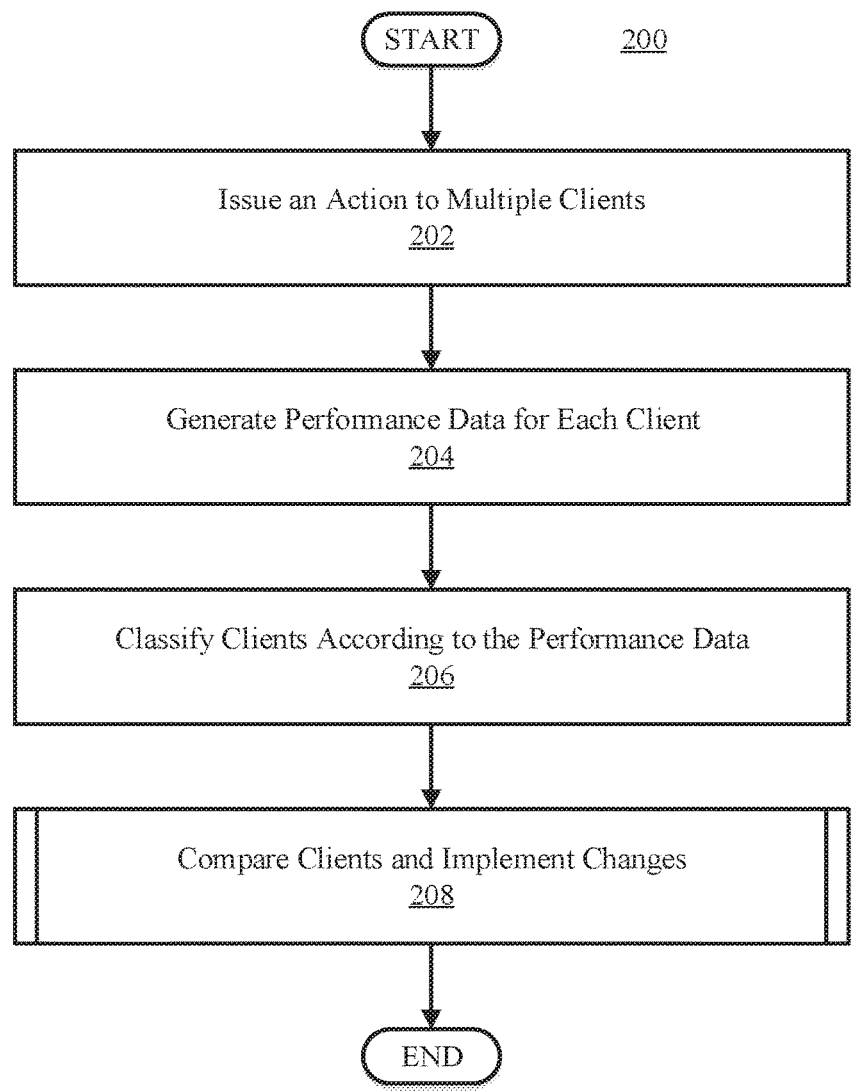
FIG. 2 illustrates a flowchart of an example method for improving the performance of one or more clients within a computing environment, in accordance with embodiments of the present disclosure.

Referring now to FIG. 2, shown is a flowchart of an example method 200 for improving the performance of one or more clients (e.g., client devices 102 and 112 described in FIG. 1) within a computing environment, in accordance with embodiments of the present disclosure. The method 200 may be performed automatically by a server (e.g., server 122 described in the FIG. 1), or by a client device (e.g., when the clients are arranged in a peer-to-peer configuration). In some embodiments, one or more operations of the method 200 may be performed by the server (or client) in response to user input.

At operation 202, the server may issue an action to multiple clients. The multiple clients may include any number of client devices. In some embodiments, the server may issue an action to the multiple clients through the network interface. Actions issued to the multiple clients may be intensive on different computer system components, and may be used to probe performance issues associated with a component of interest. For example, an action requiring distribution of large data packets to all of the multiple clients may be network intensive, and may be used to monitor and/or improve the network configurations of the multiple clients. On the other hand, in some embodiments, an issued action may include CPU benchmark testing, which may exert a heavy workload on the CPU of each client. Similarly, in some embodiments, a graphics processing unit (GPU) intensive program may be installed on all clients by the server, and run on each client to determine GPU performance issues. In some embodiments, an action may affect (e.g., be distributed evenly across) multiple computer components (e.g., CPU, RAM, GPU, Network I/F) to test multiple computer components simultaneously. This may allow testing the interaction of computer components, and may be useful to identify bottlenecks causing issues at particular instances of the action.

The issued actions may be test actions or real actions. For example, in some embodiments, test actions, such as performance benchmarking (e.g., CPU or GPU benchmark applications), may be issued to determine client performance. However, in some embodiments, the server may issue real actions similar to the environment in which the client will be operating.

Further, any number or intensity of actions (e.g., workload) may be issued by the server. In some embodiments, the server may issue multiple actions to each of the clients to determine multitasking and priority distribution capabilities of the multiple clients. In some embodiments, the action may not be possible to complete (e.g., if there is too much data or too many simultaneous actions). In these embodiments, the peak performance of the computer components may be tested, to determine their total workload capabilities. Any suitable number, type, or magnitude of actions may be implemented, and the present disclosure is not limited to embodiments described herein.

At operation 204, the server may generate performance data for each client based on each client's performance at the issued action. The performance data may include how fast each client completed the action. Further, the server may generate performance data based on the level of completion (e.g., percentage completed) of the action. The performance data may be compiled into a list, including performance data for each client in the computing environment. In some embodiments, performance data may only be generated until a certain point in time (e.g., after 2 hours, performance data generation may conclude).

After performance data is generated for each client, at operation 206, clients may be classified according to the performance data. Performance classifications (e.g., classes) may be defined for comparison considerations. Any number of classes may be generated for comparing clients. For example, two classes may be defined to compare a high performance class to a low performance class. Further, three classes may be defined to compare clients (e.g., high performance class, intermediate performance class, and low performance class). However, any number of classes may be defined, and may depend on the performance data and/or client computer configuration. In some embodiments, the performance data may be statistically distributed depending on the number of defined classes. In some embodiments, performance thresholds may be used to classify clients.

In some embodiments, a statistical distribution may be generated based on the performance data and may depend on the number of defined classes. The statistical distribution may be compiled in any manner. The server may be configured to use a performance data list (e.g., as mentioned in operation 204) and the number of sought classes to build a statistical distribution. In some embodiments, the server may order (e.g., organize) the performance data on the performance data list and thereafter build the statistical distribution depending on the number of sought classes. In some embodiments, performance data may not ordered, but may be input and automatically statistically distributed.

As previously mentioned, the statistical distribution may be based on the number of defined classes. In some embodiments, where two classes are to be compared, the server may build a 50-50 (half of the clients distributed into each of two groups based on action performance) statistical distribution. In some embodiments, each client may belong to its own class. In these embodiments, the processor may build the distribution on a bell curve, such that each client may be compared to their closest client(s) located on the bell curve. In some embodiments, where three classes are to be compared, the processor may build a 33-33-33 statistical distribution. Further, in some embodiments, the relative percentage of clients belonging in each class may be defined when generating performance classifications, and the statistical distribution may be built accordingly. For example, if only the top and bottom 10% of clients are to be included in a high performance class and a low performance class in an example with three defined classes, the statistical distribution may be built accordingly (e.g., 10-80-10). In some embodiments, classes may not be defined, as all clients may be performing equally.

In some embodiments, classifications may be defined using performance thresholds. In these embodiments, if clients achieve a certain result (e.g., a certain level of completion or a certain time in which the action was completed), the client may be placed into a corresponding performance efficiency class. For example, if there are two performance thresholds, including action completion within 30 minutes and 1 hour, three classifications may be generated. In this example, all clients completing the action within 30 minutes may be placed in a high performance efficiency class, clients completing the action over 30 minutes but within 1 hour may be placed in an intermediate performance efficiency class, and clients completing the action over 1 hour may be placed in a low performance efficiency class. Any suitable performance threshold(s) may be defined.

At operation 208, clients may be compared to identify whether there are bottlenecks causing performance issues, and changes may be implemented. In some embodiments, operation 208 may be completed according to example method 300 for comparing clients and implementing changes. Any suitable number of clients may be compared, and may be based on the client classifications. For example, in some embodiments, if there is a high performance efficiency class and a low performance efficiency class, clients from the high performance efficiency class may be compared to clients of the low performance efficiency class. Further, comparing clients may be determined according to client similarity. For example, in some embodiments, clients may not be compared if they are too different (e.g., different CPU's, memory, or operating systems).

The aforementioned operations may be completed in any order and are not limited to those described. Additionally, some, all, or none of the aforementioned operations may be completed, while still remaining within the spirit and scope of the present invention. For example, in some embodiments, operation 206 may not be completed, as all clients may be performing equally. Further, in some embodiments, changes may not be implemented in operation 208, if all clients are adequately performing the action (e.g., completing the action within a specified time frame).

Figure 3:
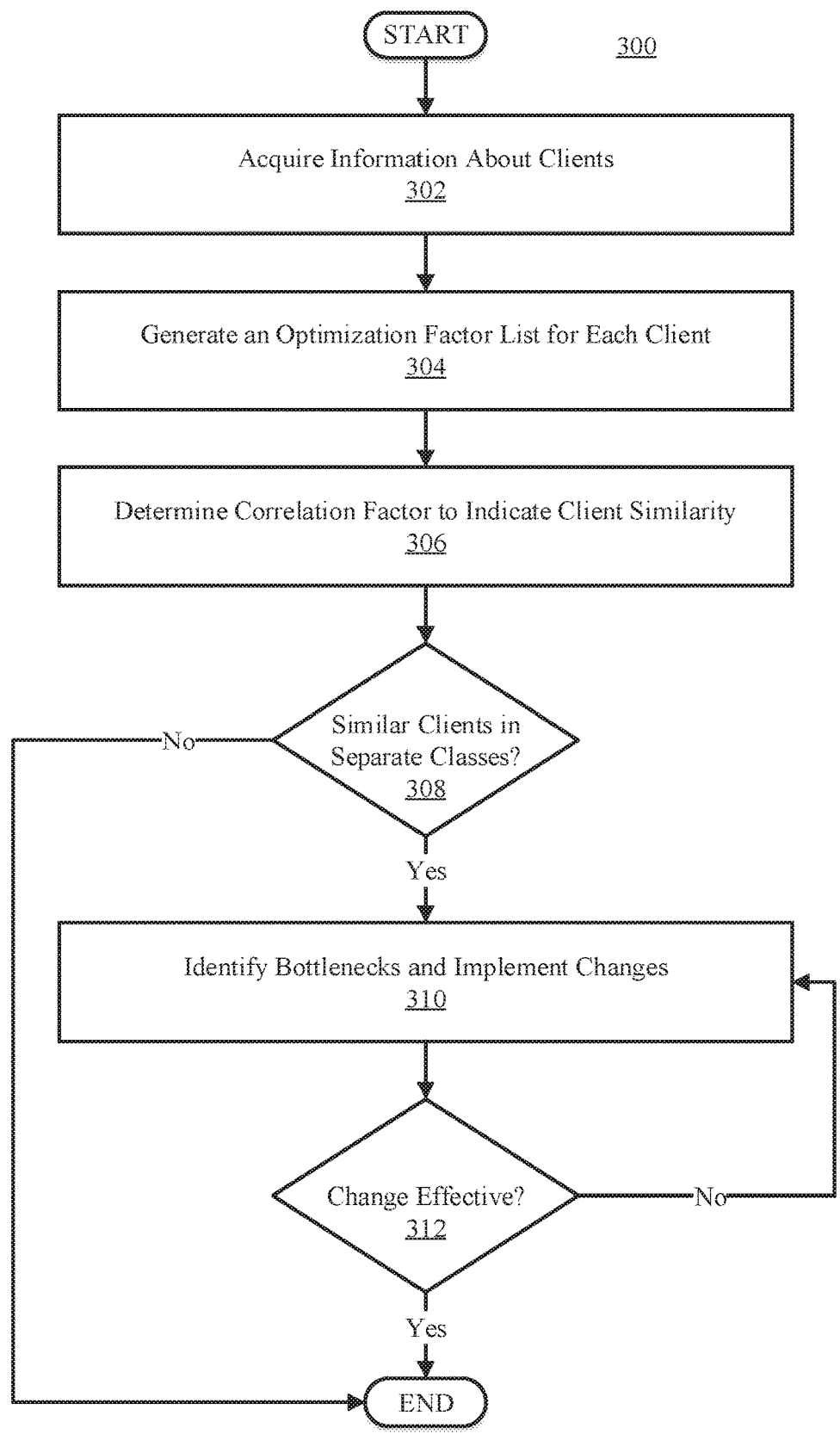
FIG. 3 illustrates a flowchart of an example method for comparing clients and administering changes based on the comparison, in accordance with embodiments of the present disclosure.

Referring now to FIG. 3, shown is an example method 300 for comparing clients (e.g., client devices 102 and 112) and administering changes based on the comparison, in accordance with embodiments of the present disclosure. In some embodiments, the method 300 may be performed by a server (e.g., server 122 in FIG. 1) or by a client device (e.g., in a peer-to-peer networking configuration). One or more operations of the method 300 may be performed by the server (or client) in response to user input.

Method 300 may start at operation 302, where information about each client may be acquired. Information about each client may include computer configuration (e.g., hardware, software, operating system, network devices, network topology, I/O devices, etc.) and/or computer system identifiers (e.g., computer names, IP addresses, MAC addresses, domains, physical locations, etc.). In some embodiments, the client compliance application of the server may include computer instructions to fetch information associated with each client (e.g., from a database/repository). In some embodiments, the client comparison application may include computer instructions to install data acquisition applications on each client, and thereafter receive information about each client from the data acquisition applications.

In some embodiments, the server may cause clients to provide information, rather than retrieving the information. In these embodiments, the server may issue a command to each client to compile information associated with their machine. However, data acquisition may be completed in any manner, and is not limited to those described herein.

At operation 304, an optimization factor list (OFL) may be generated for each client based on the previously acquired data. The client compliance application may include computer instructions to compile all acquired data, including computer configuration and computer identifiers associated with each client, into an OFL for each client. The OFL may be a list of all computer components (e.g., factors) associated with a client machine.

In some embodiments, the OFL may contain a list of all computer configuration components and computer identifiers, regardless of their influence on computer performance. Alternatively, in some embodiments, the OFL may only contain a list of computer configuration components relevant to computer performance. For example, in some embodiments, an installed (e.g., not currently running, but stored in non-volatile memory) photo editing program may be included on the OFL, regardless of whether that photo editing program influences the performance of the client. In some embodiments, the installed photo editing program may not be included on the OFL, as it may not influence client performance (e.g., the factor is negligible to client performance).

At operation 306 a correlation factor (CF) for two client devices may be determined to indicate client similarity between the two devices. Determining the CF may include comparing the two client OFLs to each other, to determine how similar the two clients are. This may allow the server to make a determination regarding whether the two clients should be compared when identifying bottlenecks and implementing changes to computer configuration.

The CF value may indicate the level of similarity between two clients. In some embodiments, the CF may be a value from 0 to 1 (e.g., similar to data correlation), with a CF of 1 indicating a high similarity between clients, and a CF of 0 indicating a low similarity between clients. However, in some embodiments, the CF may be any value used to indicate a similarity between two clients.

In some embodiments, factors in the OFL are weighted according to their impact on performance, and the CF is determined based on the weighted factors. For example, in some embodiments, a processor may be weighted higher than installed programs, as the processor may have a higher impact on performance than the installed programs. For example, the processor may be weighted with a value of 10, and the installed programs may be weighted with a value of 1 (e.g., indicating that a processor has 10 times the impact on performance compared to installed programs). In some embodiments, each factor may have a weight which is dependent on the total number of objects on the OFL. However, any other method of calculating weight for factors on each OFL may be used.

Further, the CF may be calculated in any manner. In some embodiments, each component on the OFL of a client is compared to the corresponding component on an OFL of another client. In some embodiments, OFL factors may be grouped (e.g., hardware, software, memory, network I/F, devices), and each group of factors of the OFL of a client may be compared to each group of factors of the OFL of another client.

In some embodiments, the CF may be calculated by adding up weighted differences of each computer configuration component. For example, a first client may have a CPU with a clock speed of 3.2 GHz and 6 GB of available RAM, while a second client may have a CPU with a clock speed of 1.6 GHz and 8 GB of available RAM. In this example, if the weight for the CPU is determined to be 8, and the weight of the RAM is determined to be 3, a difference may be taken between the component performance metrics (e.g., clock speed/memory) and multiplied by the weight in order to determine a weighted difference for each component across the two OFL's. In this example, the weighted difference for the CPU would be 12.8 (e.g., |3.2−1.6|×8 =12.8) Further, the weighted difference of the RAM would be 6 (e.g., |6−8|×3=6). Thereafter, the weighted differences may be added to generate a CF value of 18.8 (e.g., 12.8+6 =18.8).

The determined CF value may be compared to a threshold CF value to determine whether the two clients are considered similar. For example, if the CF threshold was defined as 20 (e.g., as defined depending on similarity requirements), then the generated CF value would satisfy the CF threshold, and therefore the clients may be analyzed for performance issues.

If two clients are vastly different, there may be no meaningful way to compare the two clients and identify bottlenecks associated with the two clients. Accordingly, there may be threshold similarity criteria that must be satisfied before determining a CF between two clients. In some embodiments, the threshold may be determining that the clients have the same operating system (OS). In these embodiments, if the clients have different operating systems, a CF between the clients may not be calculated as they may be too different to make a comparison. In some embodiments, the threshold may include determining that the clients have the same processor, operating system, and amount of Random Access Memory (RAM). In some embodiments, the threshold factors may be selected based on the factor's impact on performance. In some embodiments, the threshold similarity criteria may include a computer configuration identifier or checksum for each OFL, and the checksums may be cross-referenced to determine whether a CF should be calculated.

At operation 308, two similar clients (e.g., as indicated by the CF between the two clients) may be analyzed to determine whether they belong in separate performance classes. As previously mentioned, clients may be classified into performance classes. The classification may be used to determine whether two similar clients (e.g., high CF between the clients) differ in performance efficiency. Because there may be many identical or similar components between the two clients based on the high CF determination, there is a greater likelihood that a bottleneck may be identified between the two clients in order to improve the performance of the slower machine.

For example, if two clients have a CF of 0.93 (e.g., the clients are very similar), and a first client is in a slow performance efficiency class and a second client is a high performance efficiency class, the two clients may be compared to each other when identifying performance issues. This is because the clients may have very similar or identical components, and therefore the factor causing the performance issues (e.g., the factor causing the slower machine to be in the low performance class) may be easier to identify. In this example, the first and second client may have the same processor, memory, and operating system, but may differ in running applications. The slower client may be running an application that is consuming a relatively large amount of CPU usage and memory. Accordingly, the application running on the slow client may be identified as the bottleneck causing performance issues.

Conversely, if the CF value is low between the two clients (e.g., a CF value of 0.40), there may be too many differences between the clients to identify a bottleneck causing performance issues. For example, if the clients have a different processor, memory, and running applications, and the clients are in different performance classes, it may be difficult to pin-point the factor causing performance issues. This is because there may be a combination of factors causing performance issues between the two clients.

However, in some embodiments, clients in separate classes may be compared to identify bottlenecks regardless of the CF determination. In these embodiments, the clients may be compared based on threshold similarity criteria. For example, if the threshold similarity criteria between two clients are possessing identical processors, memory, and operating systems, and the clients belong in separate performance classes, the clients may be compared regardless of the CF value. This may be completed as the CF may not perfectly quantify similarity between two clients, depending on how CF is determined.

If the two clients are similar yet in separate performance classes, operation 308 may move forward to operation 310 to identify bottlenecks and implement changes. However, if the two clients are not similar or the two clients are in the same performance classes, method 300 may end.

At operation 310, bottlenecks may be identified and changes may be implemented based on the identified bottleneck. Bottlenecks may be identified based on the differences between the OFL's of each client. Because the clients are similar (e.g., as indicated by the CF or the threshold similarity criteria), there may be a relatively small number of differences between the two clients. This may allow the server to identify a bottleneck causing performance issues in a client in a lower performance class.

In some embodiments, the bottleneck may be identified based on factor weight (e.g., performance impact). For example, two clients may be identical except that they may differ in memory and one installed application. In this example, if the memory is weighted 100 times higher than the one installed application, the memory may be selected as the likely bottleneck.

The memory may be selected as there is a greater likelihood of a performance improvement in the slower client due to the impact memory may have on performance (e.g., as indicated by the higher weight).

In some embodiments, the bottleneck condition may be selected based on the issued action. For example, if the factor that differs between the client in the high performance class and the low performance class is relevant to the issued action (e.g., such as network topology when the action involves processing a large number of data packets), this factor may be identified as a bottleneck. Further, in some embodiments, this may be achieved by using the weight of factors in each OFL, as the weight of each factor may be dependent on the issued action.

In some embodiments, factors differing between the slow client and the fast client may be compiled onto a difference list, and the bottlenecks may be selected from the difference list. The difference list may contain factors of the slow client which differ from factors of the fast client (e.g., a list of components of the slow client). In these embodiments, the difference list may be ordered (e.g., according to weight or using historical information about the client devices), and bottlenecks may be selected starting from the highest weight and ending in the lowest weight. Further, in some embodiments, the difference list may not be ordered, and factors may be randomly selected as bottlenecks. Factors causing performance issues in the slow client may be selected in any manner, and are not limited to those described herein.

In some embodiments, multiple bottlenecks may be selected simultaneously. This may be useful to improve slow client performance based on combination solutions. For example, a slow client may have a different amount of RAM and graphics card than a fast client. In this example, individually upgrading the RAM and the graphics card may have no effect on performance of the slow client. However, if the RAM and graphics card are simultaneously upgraded, the performance of the slow client may increase significantly. This may be useful to improve the slower client's performance by simultaneously upgrading related components.

After one or more bottleneck(s) are identified, changes may be implemented. Changes may be implemented according to the selected bottleneck. For example, if the amount of RAM is selected as a bottleneck, then RAM may be upgraded.

In some embodiments, the implemented changes may mirror the factor of interest (e.g., factor relevant to the bottleneck) of the fast client. For example, if the fast client has 8 GB of RAM, and the slow client has 2 GB of RAM, and the amount of RAM was selected as the bottleneck, then the change may be to upgrade the RAM of the slow client to the RAM of the fast client (e.g., upgrade the RAM of the slow client to 8 GB).

In some embodiments, changes may be implemented incrementally to determine whether gradual changes affect the slow client performance. Following the example above, the slow client may be upgraded from 2 GB of RAM to 8 GB of RAM in increments of 2 GB. This may be useful to determine the impact on performance at each incremental upgrade. Further, any suitable increment may be used to gauge impact on performance.

In some embodiments, changes may be implemented which exceed the factor of interest (e.g., relevant to the bottleneck) of the fast client. Following the example above, the RAM of the slow client may be upgraded from 2 GB to 10 GB, exceeding the 8 GB of RAM present on the fast client. This may be implemented to determine whether the slow client will exceed performance of the fast client based on the administered change.

Further, multiple changes may be simultaneously implemented on the slow client. This may allow the server to determine whether a combination change will be more effective than two individual changes. Any type or number of changes may be implemented, and may be based on the identified bottlenecks.

In some embodiments, change implementations may be issued directly from the server (e.g., programs or software may be manually uninstalled via the server). In some embodiments, changes may be suggested by the server, and completed by a user in response to the suggestions. In some embodiments, changes/suggested changes may be implemented/transmitted from one client to another client, similar to a P2P configuration.

In some embodiments, the server may issue different changes to multiple slow (e.g., according to the classification or the relative comparison) clients. In these embodiments, the server may be configured to determine which change was most effective (e.g., based on action performance or classification shift). Further, the server may be configured to issue the effective change to all other slow clients.

After a change is implemented, the change effectiveness may be determined at operation 312. The change effectiveness may be a measure of the performance improvement of the slow client based on the administered change. For example, in some embodiments, if the change shifted a slow client from a low performance class to a high performance class, the change may be considered effective. Likewise, if the change did not shift the slow client into a higher performance class, the change may not be effective. However, change effectiveness may be determined in any other manner.

For example, change effectiveness may depend on the defined classification. For example, if the clients are classified into a curve, with each client having a discrete class, any upward shift in performance class may indicate that the change is effective.

Further, change effectiveness may depend on measured performance rather than classification shift. For example, even if the slow client remains in the same classification (e.g., low performance), if the client improved in performance (e.g., completed the action 50 seconds faster), the change may be defined as effective.

In some embodiments, change effectiveness may be numerically represented by a relevance factor (RF). The RF value may indicate the effectiveness of the change. In some embodiments, the RF value may be a value from 0 to 1, with an RF value of 1 indicating a high change effectiveness, and an RF value of 0 indicating no change effectiveness. However, the RF may be any numerical representation. Further, in some embodiments, the RF value may be used to adjust the OFL of each client and weighting of each factor when determining the CF.

If the change is determined to be effective, method 300 may end. However, if the change is not effective, operation 312 may move back to operation 310, where other bottlenecks may be identified and corresponding changes may be implemented.

The aforementioned operations may be completed in any order and are not limited to those described. Additionally, some, all, or none of the aforementioned operations may be completed, while still remaining within the spirit and scope of the present invention. For example, in some embodiments, operation 306 may not be completed. In these embodiments, there may be threshold criteria for determining whether two clients should be compared to identify bottlenecks, and a CF may not be calculated to indicate client similarity. Further, in some embodiments, operation 308 may not be completed, as there may not be predefined classes. In these embodiments, similar clients may be compared regardless of client classification.

Figure 4:
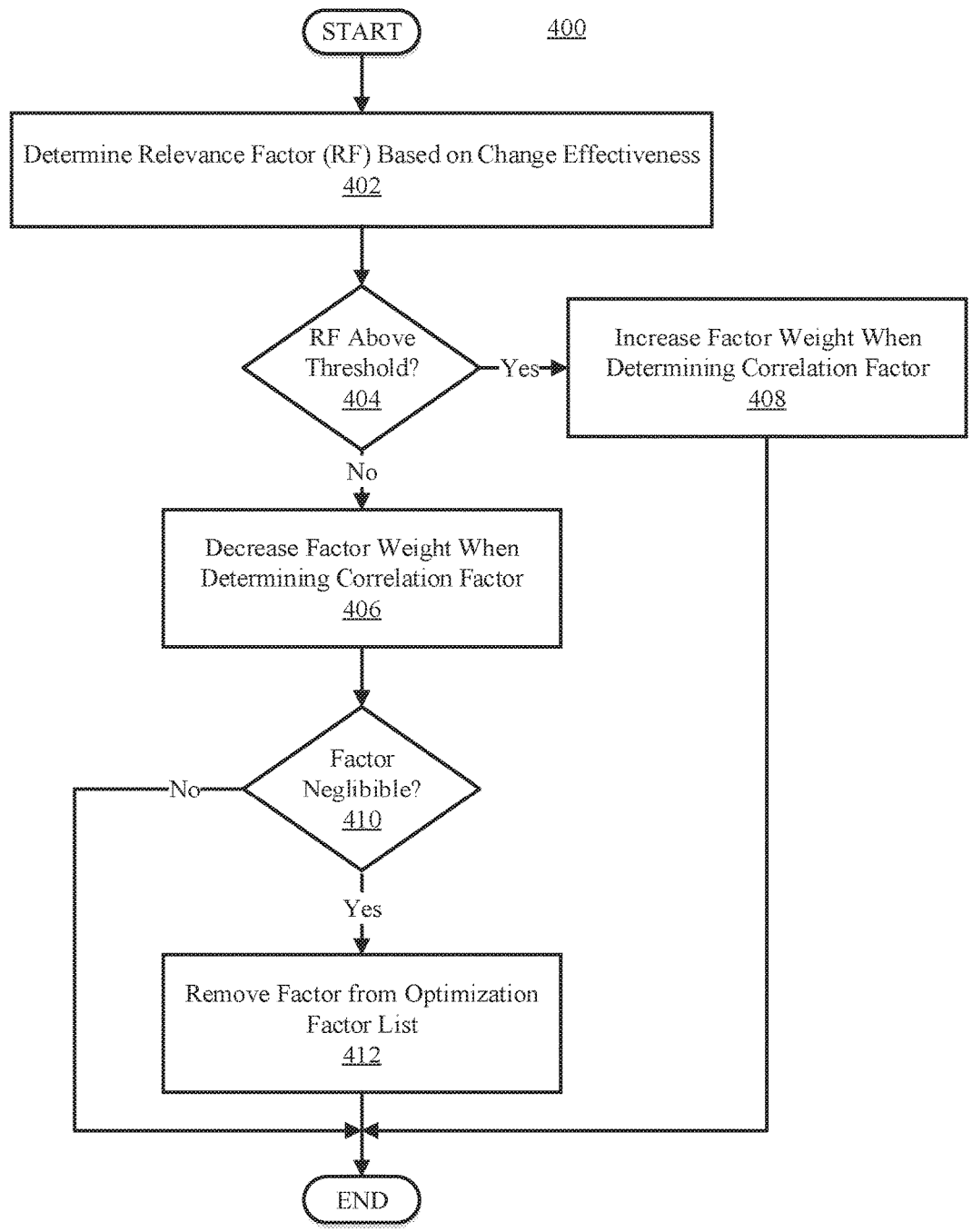
FIG. 4 illustrates a flowchart of an example method for using change effectiveness to make adjustments to factor weighting when determining a correlation factor, in accordance with embodiments of the present disclosure.

Referring now to FIG. 4, shown is an example method 400 for using change effectiveness to make adjustments to factor weighting when determining the CF, in accordance with embodiments of the present disclosure. The method 400 may be performed automatically by a server (e.g., server 122 described in the FIG. 1), or by a client device (e.g., when the clients are arranged in a peer-to-peer configuration). In some embodiments, one or more operations of the method 400 may be performed by the server (or client) in response to user input.

Method 400 may begin at operation 402, where a relevance factor (RF) may be determined based on change effectiveness. The RF may numerically represent the effectiveness of a change (e.g., one or more factors) to the system configuration of a client. In some embodiments, the RF may be a value from 0 to 1, with an RF of 1 indicating a high change effectiveness, and an RF of 0 indicating no change effectiveness. However, the RF may be any numerical representation of the change effectiveness.

The RF may be determined according to an increase in performance of the slow client. For example, in some embodiments, the metric used to determine client performance (e.g., time to complete the action, percentage of action completed) may be compared before and after the change configuration. This may provide an indication as to the improvement percentage before and after the change configuration.

In some embodiments, the RF value is determined by comparing the new time required to complete the action to the previous time required to complete the action. In these embodiments, the RF may be calculated according to the following equation: RF=((|New Time−Previous time|)/Previous Time). In an example in which the new time to complete the action is 30 seconds, and the previous time to complete the action was 532 seconds, the RF value may be calculated as such: RF=(|30−532|)/532=0.943. In this example, an RF near 1 indicates that the change was highly effective, as the time improved by 94.3% (e.g., 0.943× 100% =94.3%).

After the RF value is determined at operation 402, the RF value may be compared to a threshold RF value at operation 404 to determine whether to increase factor weight when determining a CF for the next client-client comparison. The threshold RF value may be defined based on the change effectiveness sought.

In some embodiments, the threshold RF value may be defined as the change effectiveness required to shift the client into a higher performance efficiency class. In some embodiments, the threshold RF value may be numerically defined depending on the RF range (e.g., if RF range is from 0 to 1, 0.7 may be selected as a threshold RF value). In some embodiments the RF threshold may be based on a percentage of improvement in performance (e.g., decrease in time to perform the action). However, the RF threshold may be defined in any manner otherwise consistent with the disclosure.

If the RF value is determined to be above the RF threshold, method 400 may move forward to operation 408, where the factor weight in the CF determination may be increased. If the RF value is not above the RF threshold, method 400 may move forward to operation 406, where the factor weight in the CF determination may be decreased.

At operation 408, the factor weight (e.g., corresponding to the changed factor) may be increased based on the RF. If the RF is determined to be high (e.g., above a threshold RF value), then the change may indicated as effective. Further, if the change is indicated as effective, then the factor may have a larger impact on performance, and accordingly the weight of the factor may be increased when determining the CF in the future.

In some embodiments, the weight of the changed factor may be increased based on the difference between the RF and RF threshold. For example, if the RF is determined to be 0.94, and the RF threshold was defined as 0.70, the difference between the determined RF and the RF threshold may be used to adjust the weight (e.g., 0.94−0.70=0.24). In some embodiments, the difference may be divided by the threshold RF value to determine the percentage difference between the determined RF and the threshold RF (e.g., 0.24/ 0.70=34.2%). This percentage may be used to increase the changed factor weight. In this example, the factor weight may be increased by 34.2% based on the difference between the determined RF and the threshold RF.

In some embodiments, the weight of the changed factor may be increased based on the determined RF value. For example, if the determined RF is 0.80, the changed factor weight may be increased by 80%. However, the weight of the changed factor may be increased in any other suitable manner otherwise consistent with the disclosure.

In embodiments where each factor may have a maximum weight of (1/N) (e.g., see FIG. 5B and FIG. 5C), where N is the total number of objects used in the CF determination for a client, the RF value for the changed factor may be multiplied by its total possible weight (e.g., RF×1/N). In this example, if there are 5 total objects, and the RF value was determined to be 0.9 for the changed factor, the changed factor weight would be determined by (0.9×1/5=0.18). After the weight of the changed factor is increased at operation 408, method 400 may end.

At operation 406, the weight of the changed factor may be decreased if the determined RF does not satisfy the RF threshold. In some embodiments, the weight of the changed factor may be decreased based on the difference between the RF and RF threshold. For example, if the RF is determined to be 0.54, and the RF threshold was defined as 0.70, the difference between the RF threshold and determined RF may be used to adjust the weight (e.g., 0.70−0.54=0.16). In some embodiments, the difference may be divided by the threshold RF value to determine the percentage difference between the determined RF and the threshold RF (e.g., 0.16/ 0.54=29.6%). This percentage may be used to decrease the changed factor weight. In this example, the factor weight may be decreased by 29.6% based on the difference between the determined RF and the threshold RF.

In some embodiments, the weight of the changed factor may be decreased based on the determined RF value. For example, if the determined RF is 0.40, then the changed factor weight may be decreased by 40%. However, the weight of the changed factor may be increased in any other suitable manner otherwise consistent with this disclosure.

In embodiments where each factor may have a maximum weight of (1/N) (e.g., see FIG. 5B and FIG. 5C), where N is the total number of objects used in the CF determination for a client, the RF value for the changed factor may be multiplied by its total possible weight (e.g., RF×1/N). In this example, if there are 5 total objects, and the RF value was determined to be 0.2 for the changed factor, the changed factor weight may be adjusted accordingly (0.2×1/5 =0.04).

After the weight is decreased at operation 406, the changed factor may be analyzed to determine whether the changed factor is negligible to computer performance based on the adjusted (e.g., decreased) weight at operation 410. Determining whether the changed factor is negligible may be based on a weight threshold. For example, if the weight threshold is set to 0.1, and the weight of a factor after adjustment is 0.05, the server may determine that the factor is negligible to computer performance.

In some embodiments, a factor may be determined to be negligible if it has no impact on computer performance. In these embodiments, no change in performance may generate an RF value of 0, which may bring the effective weight of the changed factor to 0 after adjustment. In these embodiments, the factor may be determined to be negligible, as it has no impact on computer performance (e.g., based on the weight of 0). However, determining whether the changed factor is negligible based on the adjusted weight may be completed in any suitable manner otherwise consistent with the disclosure.

If the changed factor is not negligible, operation 410 may end. However, if the changed factor is negligible, operation 410 may move forward to operation 412, where the factor may be removed from the OFL for the slower client. As previously mentioned, an OFL may either include all computer configuration factors regardless of their impact on performance, or may only include factors relevant to computer performance. In embodiments in which client OFL's only include factors relevant to computer performance, if the changed factor is negligible, it may be removed from the client OFL. Further, in some embodiments, the factor may be removed both from the slow client OFL and the fast client OFL, and the method 400 may end.

The aforementioned operations may be completed in any order and are not limited to those described. Additionally, some, all, or none of the aforementioned operations may be completed, while still remaining within the spirit and scope of the present invention. For example, in some embodiments, operation 412 may not be completed. In these embodiments, the OFL of each client may include all computer configuration factors regardless of their impact on computer performance.

Referring now to FIG. 5A, shown is an example table of four OFL's respective to four clients (e.g., Client A, Client B, Client C, and Client D).

Each client may have an OFL containing computer configuration factors. In the example depicted in FIG. 5A, each client may have an OFL including CPU, Memory, Registry Key XXX, Registry Key YYY, File ZZZ, and an operating system (OS).

Performance metrics (e.g., clock speed, memory amount, registry key number) may be included for each factor in order to determine similarity between clients. The performance metrics included may be specific to the factor. For example, memory amount may be used as the performance metric for memory. Likewise, registry key number may be used as the performance metric for registry keys and clock speed may be used as the performance metric for CPU's.

Any other suitable performance metric may be used, and may depend on the factor. For example, though clock speed is used as a performance metric for CPU in FIG. 5A, any other metric may be used. In some embodiments, instructions per cycle (IPC) may be used as a performance metric for CPU's instead of clock speed, as IPC may provide an indication of computer performance. Further, cycles per instruction (CPI), number of cores, amount of cache or any other suitable performance metric(s) may be used for CPU's.

In some embodiments, multiple performance metrics may be used. For example, in some embodiments, a CPU may have four performance metrics (e.g., clock speed, cycles per instruction, number of cores, and amount of cache). This may be used to more accurately compare components.

In some embodiments, a checksum or computer configuration identifier may be associated with each client, which may depend on the performance metrics of each computer configuration factor. The checksum or computer configuration identifier may be used to determine whether a CF should be determined between two clients. For example, if the checksum values associated with two clients differ significantly, a CF may not be determined between those two clients, as they may be too different to compare.

The checksum may be calculated in any manner. In some embodiments each computer configuration factor may have a number indicator corresponding to an order of magnitude (e.g., power of 10) in the checksum. For example, if there are five different operating systems and the operating systems are assigned to thousands (e.g., the order of magnitude), the checksums may generated accordingly (e.g., 1000, 2000, 3000, 4000, 5000). The magnitude of a factor may depend on the impact on performance or similarity. For example, because processors may have a large impact on computer performance and client similarity, processors may be assigned a higher check sum magnitude (e.g., millions or billions).

In some embodiments, a checksum comparison threshold may be used to determine whether a CF should be determined between two clients. In some embodiments, the checksum threshold must match down to a certain magnitude (e.g., all number indicators must match from billions to millions, and number indicators from $10^5$ to 1 may differ). In some embodiments, only the highest order of magnitude number indicators are compared to determine whether a CF should be determined. However, any suitable checksum comparison threshold may be used.

In some embodiments, the checksum may be generated similar to a hash-table (e.g., except with the possibility to extract data therefrom, as opposed to security hashes), with each list of OFL corresponding to a specific hash. In these embodiments, hashes may be ordered in terms of similarity, and determining whether a CF should be determined may be based on the hash values. However, a checksum or computer configuration identifier may be constructed in any manner otherwise consistent with this disclosure.

As seen in FIG. 5A, the checksum between Client C and any other client (e.g., Clients A, B, and D) may be too different to determine a CF between the clients. In this example, the operating system is assigned to the thousands magnitude. Further, the highest magnitude may be used as the checksum similarity threshold in this example, to determine whether a CF determination may be completed. As seen in FIG. 5A, Client C has a different operating system than all other clients, which generates a different number indicator in the thousands magnitude, indicating that Client C cannot be compared to Client A, Client B, or Client D. Though Client C may not be compared to any other client, the other clients may satisfy the checksum threshold, which may allow a CF to be determined between the other clients.

Referring now to FIG. 5B, shown is an example CF determination between Client A and Client B, as referenced in FIG. 5A, in accordance with embodiments of the present disclosure.

In the example shown in FIG. 5B, a factor comparison (e.g., Client A Memory 8 GB vs. Client B Memory 6 GB) may be weighted with a maximum weight of (1/N), where N is the total number of objects. Accordingly, in this example, each factor may have a maximum weight of 1/5, as there are 5 factors in the OFL. The factor weight may depend on the factor similarity. For example, if similarity is at a maximum between the two components, the weight may be maximum (e.g., 0.2), however if the similarity is at a minimum between the two components, the weight may be minimum (e.g., 0). Depending on the similarity of the factors, the maximum weight (e.g., 1/N) may be reduced.

Similarity may be calculated between two factors according to the following equation: Similarity=1−(|(Factor 1−Factor 2)|/(MAX(Factor 1, Factor 2)). This may provide an indication as to how similar the components are between the clients. In this example, the similarity of memory may be calculated according to the aforementioned equation (e.g., Similarity=1−((|8−6|)/(8))=0.75).

The 0.75 similarity value may be used to determine the partial CF (partial correlation factor) based on the maximum possible weight. In this example, the partial CF is generated by multiplying the similarity by the maximum possible weight (e.g., 0.75×0.2=0.15). After a partial CF is calculated between each factor of the two client OFL's, the total CF between the clients may be determined by adding up each partial CF (e.g., CF=Σpartial CF). Accordingly, the total CF between Client A and Client B may be 0.79 (e.g., 0.20+0.15+0.13+0.15+0.15=0.79).

Once the CF is determined between the clients, the CF may be compared to a CF threshold to determine whether the clients are similar. If the clients are similar, the clients may be analyzed to determine whether they belong in separate classes, in order to determine whether bottlenecks should be identified between the two clients.

In this example, the CF may satisfy a defined CF threshold of 0.70. Therefore, in this example, Client A and Client B may be analyzed to determine whether they belong in different performance classes. If the two clients belong in different classes, bottlenecks may be identified between the clients. Further, a change may be implemented based on the identified bottleneck, and the change may be analyzed to determine whether client performance was improved.

Referring now to FIG. 5C, shown below is an example CF determination for Client B and Client D, as referenced in FIG. 5A, in accordance with embodiments of the present disclosure.

As previously mentioned, factor comparison (e.g., Client B Memory 6 GB vs. Client D Memory 32 GB) may be weighted with a maximum weight of (1/N), where N is the total number of objects. Accordingly, in this example, each factor may have a maximum weight of 1/5, as there are 5 factors in the OFL. The factor weight may depend on the factor similarity. For example, if similarity is at a maximum between the two components, the weight may be maximum (e.g., 0.2), however if the similarity is at a minimum between the two components, the weight may be minimum (e.g., 0). Depending on the similarity of the factors, the maximum weight (e.g., 1/N) may be reduced.

Similarity may be calculated between two factors according to the previously referenced equation: Similarity=1−(|(Factor 1−Factor 2)|/(MAX(Factor 1, Factor 2)). This may provide an indication as to how similar the components are between the clients. In this example, the similarity of memory may be calculated according to the aforementioned equation (e.g., Similarity=1−((|6−32|)/(32))=0.19).

The similarity value of 0.19 may be used to determine the partial CF (partial correlation factor) based on the maximum possible weight. In this example, the partial CF is generated by multiplying the similarity by the maximum possible weight (e.g., 0.19×0.2=0.04). After a partial CF is calculated between each factor of the two client OFL's, the total CF between the clients may be determined by adding up each partial CF (e.g., CF=Σpartial CF). Accordingly, the total CF between Client A and Client B may be 0.46 (e.g., 0.10+0.04+0.07+0.14+0.11=0.46).

Once the CF is determined between the clients, the CF may be compared to a CF threshold to determine whether the clients are similar. If the clients are similar, the clients may be analyzed to determine whether they belong in separate classes, in order to determine whether bottlenecks should be identified between the two clients.

In this example, the CF may fail the CF threshold of 0.70, indicating that the clients are too different to determine bottlenecks between the clients. This may result from the various differences between components on each client OFL. Accordingly, bottlenecks may not be identified between Clients B and D.

Figure 6:
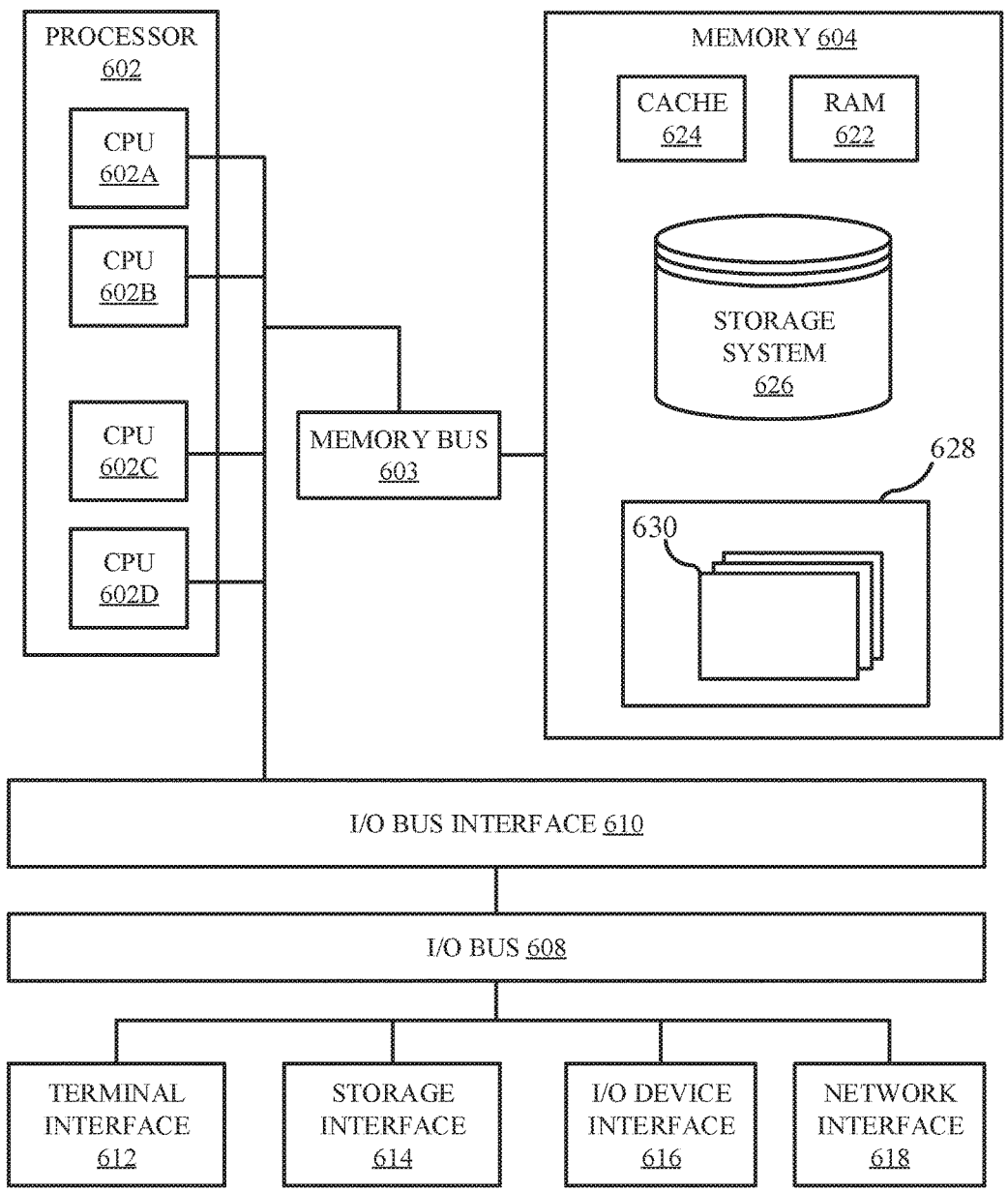
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., client device 102, client device 112, and server 122) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

The computer system 601 may model multiple components of the authorization dongle system, such as the secure server and secure device. It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, user interfaces, and program data. Each of the operating systems, one or more application programs, other program modules, and program data or some combination thereof, may include an implementation of a networking environment. Program modules 630 generally perform the functions or methodologies of various embodiments.

For example, in an embodiment of the present disclosure, the program modules 630 of the server may include a client compliance module. The client compliance module may include computer instructions to manage the one or more client devices. In some embodiments, the client compliance module may include computer instructions to transmit data (e.g., actions or change configuration suggestions) to the one or more client devices.

In some embodiments, the client compliance module may include computer instructions to allocate computer resources (e.g., CPU cores or memory) to the one or more client devices. In these embodiments, in response to an indication that the client requires more computer resources from the server, the client compliance module may include computer instructions to increase the computer resources available to the client accordingly.

In some embodiments, the client compliance module may include computer instructions to retrieve optimization factor lists (OFL's) from each client. This may allow the server to manage, monitor, and analyze factors present on each OFL.

Further, the program modules 630 of the server may include a calculation module. The calculation module may include computer instructions to complete one or more operations of the methods described herein, including building a statistical distribution for the clients based on action performance, classifying clients, generating a correlation factor (CF) between pairs of clients (e.g., when applicable), determining bottlenecks, and generating a relevance factor (RF) based on action improvement.

The program modules 630 of the two or more client devices may, in some embodiments, include a machine identifier module. The machine identifier module may include computer instructions to allow each client to compile information about their machine into an OFL. This may include computer configuration (e.g., hardware, software, operating system, network devices, network topology, I/O devices etc.) and/or computer system identifiers (e.g., computer names, IP addresses, MAC addresses, domains, physical locations, etc.) This may be forwarded to the server as requested.

The computer system 601 may interface a variety of peripheral devices, storage devices, and networks through the terminal interface 612, storage interface 614, I/O device interface 616, and network interface 618. The network interface 618 may communicatively couple the secure device and secure server to any type or number of networks. For example, the network interface 618 of the secure server and secure device may include a wired or wireless network adapter. The network adapter may communicatively couple the secure device or secure server to the network previously described. The I/O device interface 616 may be configured to communicatively couple the secure server or secure device to any type or number of peripheral devices, including mice, printers, and keyboards. The storage interface 614 may be configured to communicatively couple the secure device and secure server to storage devices (e.g., flash memory USBs, CD-ROMS, Micro SD Cards). For example, in some embodiments, the secure device may include a storage interface 614 to communicatively couple the authorization dongle to the secure device. The data connector of the authorization dongle may communicatively couple the authorization dongle to the secure device through the storage interface 514.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
    issuing, by a processor, an action to a first client and a second client;
    generating a first optimization factor list (OFL) for the first client and a second OFL for the second client;
    comparing the first OFL to the second OFL;
    generating a correlation factor (CF) between the first client and second client based on the OFL comparison, wherein the CF indicates a level of similarity between the first client and the second client, wherein generating the CF includes generating a partial CF value for each factor in the OFL, weighting each factor in the OFL, adjusting each partial CF value using a weight of the factor associated with the partial CF, and accumulating the adjusted partial CF values;
    determining that there is a bottleneck causing performance issues in the first client;
    adjusting, in response to determining that there is a bottleneck causing performance issues in the first client, a client computer configuration of the first client based on the bottleneck;
    generating, by the processor, a relevance factor (RF) based on an adjustment made to a factor of the client computer configuration; and
    altering, based on the RF of the adjustment made to the factor of the client computer configuration, the OFL and CF.

2. The method of claim 1, wherein the altering the OFL and CF comprises:
    determining that the RF exceeds a threshold RF value; and
    increasing, in response to determining that the RF exceeds the threshold RF value, the weighting of the factor that was adjusted.

3. The method of claim 1, wherein the altering the OFL and CF comprises:
    determining that the RF does not exceed a threshold RF value; and
    decreasing, in response to the RF not exceeding the threshold RF value, the weighting of the factor that was adjusted.

4. The method of claim 3, wherein the altering the OFL and CF comprises:
    determining that the weighting of the factor is negligible to the CF determination; and
    removing, in response to a determination that the weighting of the factor is negligible to the CF determination, the factor from the OFL.

5. The method of claim 1, the method further comprising:
    classifying, by the processor, the first client and the second client into performance efficiency classes based on action performance; and
    determining that the first client and the second client are in different performance efficiency classes, wherein the comparing the OFL of the first client to the OFL of the second client is performed in response to determining that the first and second clients are in different performance efficiency classes.

6. The method of claim 1, wherein the comparing the OFL of the first client to the OFL of the second client is performed in response to determining that the first and second clients have the same processor and operating system.

7. A computer program product comprising a non-transitory computer readable storage medium having program instructions embodied therewith, the program instructions executable by a processor to cause the processor to perform a method comprising:
    issuing an action to a first client and a second client;
    generating a first optimization factor list (OFL) for the first client and a second OFL for the second client;
    comparing the first OFL to the second OFL;
    generating a correlation factor (CF) between the first client and second client based on the OFL comparison, wherein the CF indicates a level of similarity between the first client and the second client, wherein generating the CF includes generating a partial CF value for each factor in the OFL, weighting each factor in the OFL, adjusting each partial CF value using a weight of the factor associated with the partial CF, and accumulating the adjusted partial CF values;
    determining that there is a bottleneck causing performance issues in the first client;
    adjusting in response to determining that there is a bottleneck causing performance issues in the first client, client computer configuration of the first client based on the bottleneck;
    generating a relevance factor (RF) based on an adjustment made to a factor of the client computer configuration, wherein a high RF indicates that the adjustment to the factor improved client performance; and
    altering, based on the RF of the adjustment made to the factor of the client computer configuration, the OFL and CF.

8. The computer program product of claim 7, wherein the altering the OFL and CF comprises:
    determining that the RF exceeds a threshold RF value; and
    increasing, in response to the RF exceeding the threshold RF value, the weighting of the factor that was adjusted.

9. The computer program product of claim 7, wherein the altering the OFL and CF comprises:
    determining that the RF does not exceed a threshold RF value; and
    decreasing, in response to the RF not exceeding the threshold RF value, the weighting of the factor that was adjusted.

10. The computer program product of claim 9, wherein the altering the OFL and CF comprises:
    determining that the weighting of the factor is negligible to the CF determination; and
    removing, in response to a determination that the weighting of the factor is negligible to the CF determination, the factor from the OFL.

11. The computer program product of claim 7, the method further comprising:
    classifying the first client and the second client into performance efficiency classes based on action performance; and
    determining that the first client and the second client are in different performance efficiency classes, wherein the comparing the OFL of the first client to the OFL of the second client is performed in response to determining that the first and second clients are in different performance efficiency classes.

12. A system comprising:
    a memory storing program instructions on a non-transitory computer-readable medium;

a first client and a second client; and a processor communicatively coupled to the memory and the first client and the second client, wherein the processor is configured to execute the program instructions to perform a method comprising:

issuing an action to the first client and the second client;

generating a first optimization factor list (OFL) for the first client and a second OFL for the second client;

comparing the first OFL to the second OFL;

generating a correlation factor (CF) between the first client and second client based on the OFL comparison, wherein the CF indicates a level of similarity between the first client and the second client, wherein generating the CF includes generating a partial CF value for each factor in the OFL, weighting each factor in the OFL, adjusting each partial CF value using a weight of the factor associated with the partial CF, and accumulating the adjusted partial CF values;

determining that there is a bottleneck causing performance issues in the first client;

adjusting in response to determining that there is a bottleneck causing performance issues in the first client, client computer configuration of the first client based on the bottleneck;

generating a relevance factor (RF) based on an adjustment made to a factor of the client computer configuration, wherein a high RF indicates that the adjustment to the factor improved client performance; and altering, based on the RF of the adjustment made to the factor of the client computer configuration, the OFL and CF.

13. The system of claim 12, wherein the altering the OFL and CF comprises:

determining that the RF exceeds a threshold RF value; and increasing, in response to the RF exceeding the threshold RF value, the weighting of the factor that was adjusted.

14. The system of claim 12, wherein the altering the OFL and CF comprises:

determining that the RF does not exceed a threshold RF value;

decreasing, in response to the RF not exceeding the threshold RF value, the weighting of the factor that was adjusted;

determining that the weighting of the factor is negligible to the CF determination; and removing, in response to a determination that the weighting of the factor is negligible to the CF determination, the factor from the OFL.

15. The system of claim 12, the method further comprising:

classifying the first client and the second client into performance efficiency classes based on action performance; and determining that the first client and the second client are in different performance efficiency classes, wherein the comparing the OFL of the first client to the OFL of the second client is performed in response to determining that the first and second clients are in different performance efficiency classes.

16. The system of claim 12, wherein the comparing the OFL of the first client to the OFL of the second client is performed in response to determining that the first and second clients have the same processor, memory, and operating system.

* * * * *